(No Model.)
W. L. ALBRIGHT.
CAR COUPLING.
No. 271,674. Patented Feb. 6, 1883.
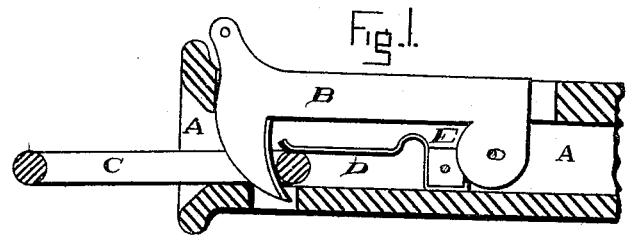
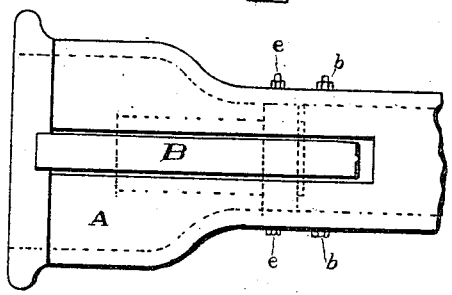
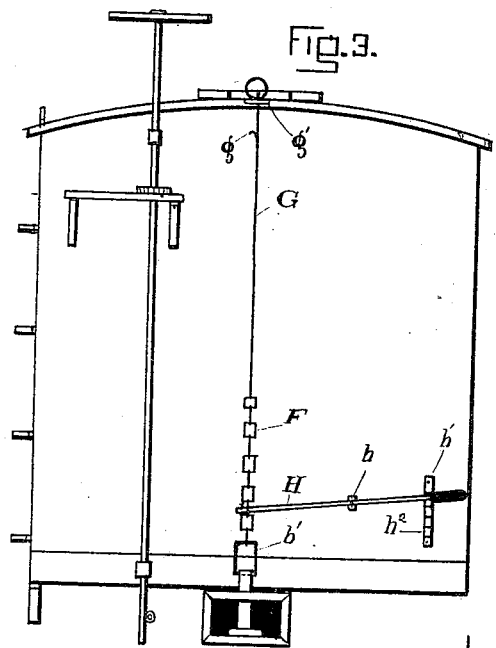
ATTEST
Horatio V. Croll
Mary Murray
INVENTOR
William L. Albright
By Geo. J. Murray
Atty

UNITED STATES PATENT OFFICE.

WILLIAM L. ALBRIGHT, OF CINCINNATI, OHIO, ASSIGNOR OF ONE-THIRD TO HENRY VARWIG, OF SAME PLACE.

CAR-COUPLING.

SPECIFICATION forming part of Letters Patent No. 271,674, dated February 6, 1883.

Application filed June 13, 1882. (No model.)

*To all whom it may concern:*

Be it known that I, WILLIAM L. ALBRIGHT, a citizen of the United States, residing at Cincinnati, in the county of Hamilton and State of Ohio, have invented certain new and useful Improvements in Railway-Car Couplings, of which the following is a specification.

The object of my invention is an improved means to automatically couple cars, using as the connecting device the ordinary coupling-link, and a convenient means to uncouple the same and hold the coupling hook or dog uncoupled without going between the cars. Its object is also a strong simple device that is not liable to get out of order. These objects are accomplished by the means illustrated in the accompanying drawings, in which—

Figure 1 is a longitudinal vertical section of my draw-head and the coupling-link. The locking-dog and spring arrangement to hold the link in a horizontal position are shown in side elevation. Fig. 2 is a top plan view of the device, and Fig 3 is an end elevation of a freight-car provided with my improvements.

Similar reference-letters indicate like parts wherever they occur throughout the various views.

The draw-head A has a longitudinal slot on top to receive the locking-dog B, which fits freely into it. The forward hooked end of the dog drops down into an opening in the lower side of the draw-head. The forward end of the dog curves on an incline from the inside top of the draw-head backward and downward to the opening in the under side, so that when the link C strikes into the mouth of piece A, when the cars come together, the dog will be thrown up by it, and by its own weight it will again drop into the position shown, coupling the cars together. The upper forward end of the dog bears against the forward end of the draw-head, which thus sustains all the strain of the draft. The inside of the hooked end of the dog B, inclining like the outside, the strain of the link C tends to draw it downward against the upper end of the slot in top of piece A. The dog is thus held against jumping up, and the entire strain is taken off the bolt $b$, which passes through the sides of the draw-head, and an elongated perforation at the rear end of the dog. This bolt is the journal upon which the dog turns when raised and lowered. Within the draw-head is a spring, D, the rear end of which is bent around a metal cross-piece, E, by which it is held in place. The piece E is held in place by a bolt, $e$, passing through it and the draw-head, and secured by a nut on the outside. The spring arches up in front of the cross-piece, and extends forward to nearly the hooked end of dog B, terminating at its forward end in an upward bend to receive and guide the link C between it and the bottom of the box to hold the link in a horizontal position, so that it will enter the opposite draw-head when the cars come together, and automatically couple them. The cross-piece E is curved upon the rear end to the shape of the circular journaled end of the dog B, which bears against it. The cross-piece thus receives part of the strain in pulling. As seen in dotted line, Fig. 2, the spring D is wider than the dog B and the slot through which the dog passes, so that downward motion of outer end of the link will not throw up the dog.

In coupling the cars, the inner end of the link strikes against the upturned portion of the spring in front of the cross-piece E, or against an elastic buffer in front of the same. To uncouple the cars from the top, a link, $b'$, passes through the eye in the forward upturned end of the dog B. To this a chain, F, and rod G which is connected to the chain, pass up to the top of the car. The rod terminates at top in an eye or handle, and below the staple or guide through which it passes is a hook, $g$, which, when the rod is pulled up, may be passed over the staple and hold the dog up when it is desirable to hold the cars uncoupled. The cars are uncoupled from the side by lever H, fulcrumed at $h$ on the end of the car. The inner end of the lever passes through one of the links in chain F, and is prevented slipping out by a pin in the end of the lever. The outer end of the lever has a handle, $h'$, by which it is operated to uncouple the cars. The dog is held up, when desired, by pressing the lever into engagement with the teeth of a ratchet-bar, $h^2$, secured on the end of the car.

What I claim as new, and desire to secure by Letters Patent, is—

1. The combination, substantially as before set forth, of the draw-head slotted longitudinally at its upper side, the cross-piece E, secured within the draw-head, and the dog B, constructed to abut at its pivoted end against the rear side of the cross-piece E and at its hook end against the forward end of the slot in the draw-head.

2. The combination, substantially as before set forth, of the draw-head longitudinally slotted at its upper side, the cross-piece E, the dog B, pivoted in rear of said cross-piece, and the spring secured to the cross-piece, and extending horizontally toward the hooked end of the dog.

3. The combination, substantially as before set forth, of the longitudinally-slotted draw-head, cross-piece E, pivoted dog B, arranged to abut against said piece E and the forward end of the slot, the rod G, and the lever H.

WILLIAM L. ALBRIGHT.

Witnesses:
GEO. J. MURRAY,
MARY MURRAY.